UNITED STATES PATENT OFFICE 2,430,233

HALOGEN-YIELDING COMPOSITIONS

Paul La Frone Magill, Ransomville, N. Y., assignor to E. I. du Pont de Nemours & Company, Wilmington, Del., a corporation of Delaware No Drawing. Application June 5, 1944, Serial No. 538,879

14 Claims. (Cl. 252—187)

This invention relates to certain new and improved oxidizing compositions and a method for making the same.

This is a continuation-in-part of my copending application Serial No. 486,092, filed May 7, 1943.

The N,N'-dichloro-disubstituted hydantoins are valuable oxidizing compounds when dissolved in water. A large variety of disubstituted hydantoins may be prepared from various ketones by reacting ketones with hydrocyanic acid or a cyanide, ammonia, and carbon dioxide.

For example, one suitable method is to react a ketone with hydrocyanic acid to prepare the corresponding ketone cyanhydrin and then to react the cyanhydrin with an ammonium carbonate solution. Such disubstituted hydantoins react very readily with chlorine so that on chlorination by conventional methods a dichlorohydantoin is formed having the formula:

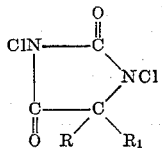

where R and R' represent any organic radicals, for example, alkyl or aryl groups. For example, the lowest molecular weight member of the series is 1,3-dichloro-5,5-dimethyl hydantoin which may be made by reacting acetone with hydrocyanic acid and then reacting the resulting acetone cyanhydrin with ammonium carbonate and finally chlorinating the resulting dimethyl hydantoin. Similarly, 1,3-dichloro-5-methyl-5-ethyl hydantoin may be made from methyl ethyl ketone, 1,3-dichloro-5-methyl-5-phenyl hydantoin from acetophenone and 1,3-dichloro-5,5-pentamethylene spiro hydantoin from cyclohexanone.

The dichloro-disubstituted hydantoins have strong oxidizing characteristics when dissolved in water and have a relatively high oxidation potential, very close to that of sodium hypochlorite. They are thus useful for various oxidizing purposes, including bleaching and for disinfectant and bactericidal purposes. The above-mentioned dichloro-dimethyl hydantoin is sold for such purposes under the trade-mark name "Dactin." This is the most soluble of the series, as the solubility tends to decrease as the molecular weights of the substituent groups R and R' are increased.

However, the solubilities of all these dichloro-disubstituted hydantoins are relatively low and for many purposes these materials do not provide a sufficiently high quantity of available active chlorine in the aqueous solution. Also, the oxidation potential of these dichloro compounds is too high for some purposes. It has, therefore, been desired to have a chlorohydantoin having a higher solubility than the above-mentioned dichloro compounds and a lower oxidation potential and a degree of chemical stability not lower than that of the dichloro compounds.

An object of the present invention is the preparation of all new and improved oxidizing compositions of the chlorohydantoin type. A further object is the preparation of novel N-monochlorohydantoin compounds. Still other objects will be apparent from the following description of my invention.

I have discovered that the N-monochlorohydantoins can be easily and cheaply prepared by reaction between a dichloro-disubstituted hydantoin of the type described above and a corresponding unchlorinated disubstituted hydantoin. The reaction may be represented as follows:

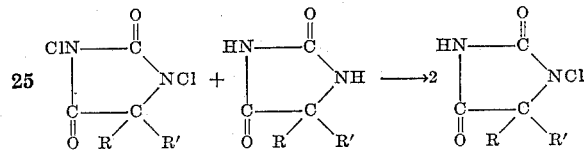

The N-monochloro compounds thus prepared according to my invention have been found to have much higher solubility and to be much more stable chemically than the corresponding dichloro compounds. They may be utilized in alkaline solutions as well as neutral or in mildly acidic aqueous solutions. They are also soluble in a variety of organic solvents. The oxidation potentials of these N-monochloro compounds are much lower than that of the corresponding dichloro compounds; generally, the oxidation potential of the monochlorohydantoin is roughly half that of the corresponding dichloro compound.

The simplest method of carrying out the above reaction to produce the N-monochloro-disubstituted hydantoins is to simply react the unchlorinated hydantoin with the dichlorohydantoin in aqueous solution. If an aqueous solution of the dichloro compound is used for this purpose, the result of the reaction is an aqueous suspension of the corresponding N-monochloro compound. However, it is not necessary to have all of the dichloro compound in solution, and it is generally preferred to make a slurry or paste of the dichloro compound with a relatively small amount of water and to mix therewith the unchlorinated compound. After the mixture is stirred for a sufficient time to insure such reaction, which generally requires from one-half hour to several hours, the product may be recovered by filtering or pressing to remove the bulk of the water, followed by a conventional drying operation. If equimolar proportions of the dichloro compound and the unchlorinated compound are used, the resulting product will be substantially pure N-monochlorohydantoin, the yield being substantially 100%. The reaction occurs readily at relatively low temperatures, such as 15–30° C. and will occur at lower temperatures, though more slowly. Higher temperatures up to 100° C. or thereabouts may be utilized if desired, but generally there is no advantage in using higher temperatures when the reaction is carried out in the presence of water.

The above reaction also may be carried out by merely heating a dry mixture of the reactants to a temperature at least sufficiently high to form a molten mass. The minimum temperature utilized for this method will depend upon melting points of the reactants and the product. Generally a temperature within the range of about 75 to 150° C. will be suitable.

The above-described reaction also may be carried out in organic solvents in which the reactants are soluble. For example, various chlorinated hydrocarbon solvents, such as carbon tetrachloride, tetrachlorethylene, chloroform, methylene chloride, tetrachlorethane and the like. As the reaction tends to go more slowly in organic solvents than in water, it is generally desirable to heat the reaction mixture, for example, to a temperature of from 50° up to the boiling point of the solvent. This operation may be carried out by merely subjecting the mixture of reactants in the organic solvent to refluxing conditions, for example, for a period of from 30 minutes to one hour. The product then may be recovered by evaporating the solvent.

In carrying out the above-mentioned reaction, I prefer to use substantially equimolar proportions of the reactants in order to produce a substantially pure N-monochlorohydantoin. However, the invention is not so restricted, as for some purposes it is desirable to use an excess of either of the reactants and thus to produce a mixture of the monochloro compound with the reactant used in excess. For example, if it is desired to have an N-chloro composition having properties somewhere between the properties of dichlorohydantoin and monochlorohydantoin, I may carry out the reaction using an excess of the dichloro compound and thereby produce a composition which is an intimate mixture of the monochloro- and dichlorohydantoins.

In accordance with my invention, I may also prepare a dry mixture of a dichloro-disubstituted hydantoin with an unchlorinated disubstituted hydantoin. This novel composition may be dissolved in water or in organic solvents, whereupon it exhibits the properties of a solution of the corresponding N-monochlorohydantoin. I have found that such dry compositions have excellent chemical stability and may be stored or shipped for long periods of time substantially without loss of active chlorine content. Such compositions preferably contain equimolar proportions of a dichlorohydantoin and the corresponding unchlorinated hydantoin but, if desired, various other proportions may be utilized, depending upon the desired properties for different purposes.

I have now found that by admixing such dichlorohydantoin with an unchlorinated hydantoin, there is produced an active chlorine-yielding agent having a reduced oxidation potential. The mixture is more soluble in water and aqueous liquids so that a solution having a higher content of available chlorine may be produced. The mixture in solution behaves as if part of the chlorine present in the dichlorohydantoin is transferred to the unchlorinated hydantoin, so that the end product appears to constitute, when approximately equimolar proportions of the two compounds are present, an N-monochloro-5,5-dimethyl hydantoin, so that the final product is of lower chlorine percentage and reduced oxidation potential. Regardless of this, as a result of the peculiar action of the unchlorinated hydantoin on the 1,3-dichlorohydantoin, the solubility is increased so that the resulting solution contains a higher quantity of available chlorine than can be produced by utilizing 1,3-dichlorohydantoin alone.

In order to show the effect of the incorporation of the unchlorinated hydantoin with the dichlorohydantoin on the available chlorine content of the resulting solution, tests have shown that a solution containing dissolved therein 0.16% of 1,3-dichloro-5,5-dimethyl hydantoin, which solution may be prepared in about twenty minutes with water at 25° C., is equivalent to approximately 1200 parts per million of available chlorine. When an equimolar mixture of dimethyl hydantoin and dichloro dimethyl hydantoin is prepared I have found that it is possible under the same conditions to bring much more than 0.16% of 1,3-dichloro-5,5-dimethyl hydantoin into solution, and that at 25° C. in a period of twenty minutes it is possible to obtain a solution containing 3800 parts per million of available chlorine. This is over three times that possible under the same conditions when the dichloro compound is dissolved alone, i. e. without the presence of dimethyl hydantoin.

Moreover, the solution resulting under such circumstances when an equimolecular mixture of the dichloro dimethyl hydantoin and the dimethyl hydantoin is dissolved in water is much more stable under conditions of storage than a solution containing no dissolved 5,5-dimethyl hydantoin. In tests extending over a period of one and one-half months, both with the dry mixture of 1,3-dichloro-5,5-dimethyl hydantoin and dimethyl hydantoin, and with solutions prepared by dissolving that dry mixture in water, very little loss of active chlorine has been observed. In the case of the solutions, due to evaporation of water therefrom without equivalent loss in chlorine content, the percentage of active chlorine present therein has actually been found to increase somewhat. In one test the initial active chlorine content was 0.175%, while at the end of approximately six weeks the active chlorine content, instead of decreasing, had actually increased to 0.192%. In another similar test, the initial active chlorine content of the solution was 0.168%, while at the end of six weeks it was 0.185%. Analyses of the change in active chlorine content of the dry equimolar mixture when stored over the same period indicated a loss of only approximately 2.8%, the initial active chlorine content being 22.8% while that at the end of six weeks was 20.0%. It is, therefore, apparent that the presence of the dimethyl hydantoin, either in the dry solid composition or in solutions prepared therefrom, substantially increases the stability thereof. This effect is, of course, not restricted to compositions containing equimolar amounts of the dichloro- and non-chlorin containing 5,5-dimethyl compounds, as the desirable effects of increased chlorine content of the solutions and greater stability, both of the solutions and of the dry composition, are obtained when there is at least 0.5 mole of 5,5-dimethyl hydantoin present for every mole of 1,3-dichloro-5,5-dimethyl hydantoin.

Reduced oxidation potential is important in certain instances where it is desired that the active chlorine compound exerts its characteristic germicidal effect without bleaching the material treated to an undesired degree. Thus in treating dyed garments, dyed fabric, etc., in order to destroy bacteria present thereon, it is generally necessary that the antiseptic or germicidal action be effected without lightening to any extent the color of the dyed garment or fabric. I have found that my improved active chlorine yielding mixtures comprising an unhalogenated hydantoin and dihalohydantoin in molar amounts of at least 0.25 to 1 possess the definite advantage of reduced oxidation potential as compared with the dihalohydantoin alone.

For example, the effect of various amounts of 5,5-dimethyl hydantoin, present in molar proportions ranging from 0.25 mole for every mole of 1,3-dichloro-5,5-dimethyl hydantoin to 3.0 moles per mole of 1,3-dichloro-5,5-dimethyl hydantoin, in reducing the oxidation potential of the resulting solution is shown in the following table. It should be noted that when the pH value of the solution was 6.0, a solution containing 1,3-dichloro-5,5-dimethyl hydantoin alone, (no 5,5-dimethyl hydantoin being present) had an oxidation potential of 0.96 volt. Similarly, at a pH of 8.0, this solution in which no dimethyl hydantoin was present had an oxidation potential of 0.82 volt. The values secured at these two pH values when a solution was prepared by dissolving a mixture containing varying amounts of the dimethyl hydantoin and the dichloro dimethyl hydantoin are evident from Table I.

TABLE I

*Composition of mixture of 1,3-dichloro-5,5-dimethyl hydantoin and 5,5-dimethyl hydantoin used in preparing solution*

| pH of Solution | Moles 1,3-dichloro-5,5-dimethyl hydantoin | Moles dimethyl hydantoin | Oxidation potential in volts |
|---|---|---|---|
| 6.0 | 1 | 0 | 0.96 |
| 6.0 | 1 | 0.25 | 0.92 |
| 6.0 | 1 | 0.5 | 0.92 |
| 6.0 | 1 | 1.0 | 0.92 |
| 6.0 | 1 | 2.0 | 0.90 |
| 6.0 | 1 | 4.0 | 0.86 |
| 6.0 | 1 | 6.0 | 0.84 |
| 8.0 | 1 | 0 | 0.82 |
| 8.0 | 1 | 0.25 | 0.79 |
| 8.0 | 1 | 0.5 | 0.69 |
| 8.0 | 1 | 1.0 | 0.62 |
| 8.0 | 1 | 2.0 | 0.63 |
| 8.0 | 1 | 3.0 | 0.62 |

These potentials were determined against a saturated calomel half cell.

Various changes in the relative proportions of the two ingredients present in my dry stable compositions may be made without departing from the scope of the invention. Of course, in addition to the dihalohydantoin and the unhalogenated hydantoin, other materials such as buffering agents and surface tension-reducing agents may be present in the dry mixture. Thus, sodium bicarbonate and other substances of similar alkalinity are compatible with the mixture and may be introduced in various amounts for the purpose of maintaining a pH value falling within any specified range when the dry solid composition is dissolved in water.

The invention is further illustrated by the following examples:

EXAMPLE 1

*Monochloro dimethyl hydantoin*

To 500 cc. of water contained in a 1-liter beaker was slowly added 67.2 g. (0.525 mole) of 5,5-dimethyl hydantoin and 98.5 g. (0.500 mole) of 1,3-dichloro-5,5-dimethyl hydantoin. The reaction mixture was vigorously stirred at room temperature until two successive test samples gave the same melting point, 3 to 4 hours usually being sufficient. The resulting monochloro dimethyl hydantoin was then filtered off and dried. An 88% yield (143 g.) of N-monochloro-5,5-dimethyl hydantoin melting at 149–150° C. was obtained.

EXAMPLE 2

*Monochloro dimethyl hydantoin prepared in water*

5,5-dimethyl hydantoin (1075 g.) was dissolved in 8 liters of water containing 1 g. of "Aerosol OT." 1,3-dichloro-5,5-dimethyl hydantoin (1576 g.) was added and the mixture stirred at room temperature for 3 hours. The product was filtered off, washed thoroughly and air-dried. It melted at 147–148° C. and contained 21.75% active chlorine. Yield 94%.

EXAMPLE 3

*Monochloro methyl ethyl hydantoin*

To 500 cc. of water contained in a 1-liter beaker was slowly added 74.6 g. (0.525 mole) of 5-methyl-5-ethyl hydantoin and 105.5 g. (0.5 mole) of 1,3-dichloro-5-methyl-5-ethyl hydantoin. The reaction mixture was stirred vigorously at room temperature until two successive test samples gave the same melting point, 4 to 5 hours usually being sufficient to complete the reaction. The resulting N-monochloro-5-methyl-5-ethyl hydantoin was then filtered off and dried. An 83.3% yield (147 g.) of product melting at 94–96° C. was obtained.

EXAMPLE 4

*Monochloro methyl ethyl hydantoin*

1,3-dichloro-5-methyl-5-ethyl hydantoin, prepared by the chlorination of 1207 g. of 5-methyl-5-ethyl hydantoin in aqueous sodium carbonate, was suspended in 8 liters of water. 5-methyl-5-ethyl hydantoin (1207 g.) and 1 g. "Aerosol OT" were added, and the mixture stirred at room temperature for 15 hours. The product was filtered off, washed and air dried; it melted at 94–96° C., and contained 20.15% active chlorine. Yield 79.1%.

EXAMPLE 5

*Monochloro methyl isobutyl hydantoin*

To 12 liters of water in a 20-liter container was slowly added 1071 g. (6.3 moles) of 5-methyl-5-isobutyl hydantoin, 1434 g. (6.0 moles) of 1,3-dichloro-5-methyl-5-isobutyl hydantoin and 10 cc. of a 1% solution of "Aerosol OT" (dioctyl sodium sulfosuccinate). The reaction mixture was stirred vigorously at room temperature until two successive test samples gave identical melting points, 4 to 5 hours usually being sufficient. The resulting N-monochloro-5-methyl-5-isobutyl hydantoin was then filtered off and dried. A 94.3% yield (2314 g.) of product melting at 69–70° C. was obtained.

EXAMPLE 6

*Monochloro methyl isobutyl hydantoin*

1,3-dichloro-5-methyl-5-isobutyl hydantoin, prepared by the chlorination of 1135 g. of 5-methyl-5-isobutyl hydantoin, was suspended in 7.5 liters of water containing 1 g. "Aerosol OT." 5-methyl-5-isobutyl hydantoin (1135 g.) was added, and the mixture stirred at room temperature for 6 hours. The product, after filtering, washing and drying, melted at 69–70° C. and contained 17.45% active chlorine. Yield 94.5%.

EXAMPLE 7

*Monochloro pentamethylene spiro hydantoin*

To 3 liters of water contained in a 4-liter beaker was slowly added 168 g. (1.0 mole) of 5,5-pentamethylene spiro hydantoin and 237 g. (1.0 mole) by 1,3-dichloro-5,5-pentamethylene spiro hydantoin. The reaction mixture was vigorously stirred at room temperature until a material of constant melting point was obtained, 3 to 4 hours usually being sufficient. The resulting N-monochloro-5,5-pentamethylene spiro hydantoin was then filtered off and dried. At 95.8% yield (388 g.) of product melting at 146–8° C. was obtained. This compound has the formula:

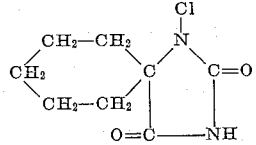

EXAMPLE 8

*Monochloro pentamethylene spiro hydantoin*

Pentamethylene spiro hydantoin (60 g.) was chlorinated in an aqueous sodium carbonate solution to yield the 1,3-dichloro derivative (M. P. 126–127° C.; active Cl found 29.95%, calculated 29.95%). The wet product was mixed with an additional 60 g. of the hydantoin in about 7 liters of water containing 1 g. "Aerosol OT," and stirred for 2 hours at room temperature. The product was filtered off, washed and dried to constant weight at 80–85° C. It was found to melt at 138–140° C., and to contain 17.3% active chlorine. (Calculated for $C_8H_{11}N_2O_2Cl$: 17.5%.) Yield 92.5%.

EXAMPLE 9

*Fusion of dimethyl hydantoin with a dichlorohydantoin*

Equimolar quantities of 5,5-dimethyl hydantoin and 1,3-dichloro-5,5-dimethyl hydantoin were mixed intimately and fused. The product was N-monochloro-5,5-dimethyl hydantoin, melting at 144–148° C.

EXAMPLE 10

*Monochloro methyl ethyl hydantoin prepared in methylene chloride*

5-methyl-5-ethyl hydantoin (142 g.), 1,3-dichloro-5-methyl-5-ethyl hydantoin (211 g.) and methylene chloride (500 cc.) were mixed and heated under reflux for half an hour, during which time substantially all the solids dissolved. The hot solution was clarified by filtration. On cooling, a crystalline precipitate of monochloro methyl ethyl hydantoin was formed. The product melted at 94–95° C., and contained 20.0% active chlorine (calculated for $C_6H_9N_2O_2Cl$: 20.1%). Yield 89.9%.

EXAMPLE 11

*Monochloro methyl isobutyl hydantoin prepared in carbon tetrachloride*

5-methyl-5-isobutyl hydantoin (170 g.), 1,3-dichloro-5-methyl-5-isobutyl hydantoin (239 g.) and carbon tetrachloride (400 cc.) were heated under reflux for ½ hour, and the product recovered by cooling and evaporating the solution. It melted at 69–72° C., and contained 16.9% active chlorine (calculated for $C_8H_{13}N_2O_2Cl$: 17.3%). Yield 91.2%.

In carrying out the above-described reactions to produce the monochlorohydantoins and in preparing the above-described mixtures, I may react or mix a dichloro-disubstituted hydantoin with a different unchlorinated hydantoin. Thus, for example, I may prepare a mixture of dichloro dimethyl hydantoin and unchlorinated methyl ethyl hydantoin. When this mixture is subjected to reacting conditions, for example, by solution in water or other solvent or by heating to the melting point, a mixture of the corresponding N-chloro compounds is formed, that is, a mixture of N-monochloro dimethyl hydantoin and N-monochloro methyl ethyl hydantoin. As will be apparent to the skilled chemist, various other mixtures may thus be prepared or reacted, and if desired, a plurality of dichloro compounds may be reacted with a plurality of unchlorinated hydantoins.

While my invention has been described above by reference to the production of N-monochlorohydantoins from N-dichlorohydantoins, the invention also may be carried out by using other dihalogenated hydantoins to make the corresponding monohalohydantoins. For example, I may use the corresponding dibromo-, diiodo-, or difluorohydantoins and thus produce the corresponding monobromo-, monoiodo-, and monofluorohydantoins.

For most purposes, the above-described N-monochloro dimethyl hydantoin is preferred as it has the highest solubility in water and has excellent oxidizing properties. However, I have found that the corresponding N-monochloro-5-methyl-5-ethyl hydantoin and the N-monochloro-5-methyl-5-isobutyl hydantoin, which may be readily prepared by my above-described process, are excellent oxidizing agents and for some purposes may be preferred to the dimethyl compound. Other examples of monohalo compounds which may be made by the process of my invention are N-monochloro-5-methyl-5-n-amyl hydantoin; N-monochloro-5-methyl-5-n-butyl hydantoin; N-monochloro-5-methyl-5-isobutyl hydantoin; N-monochloro-5-methyl-5-isobutylene hydantoin; N-monochloro-5-methyl-5-phenyl hydantoin; N-monochloro-5-ethyl-5-phenyl hydantoin; N-monochloro-5-methyl-5-acetic acid ester hydantoin; N-monochloro-5-methyl-5-cyclohexyl hydantoin; N-monochloro-5-pentamethylene-5-spiro hydantoin; and N-monobromo-5,5-dimethyl hydantoin. All of these N-monohalo compounds have properties similar to those of the corresponding N-monochloro dimethyl hydantoin, and in each case have higher solubility, a lower oxidation potential, and a higher degree of chemical stability than the corresponding dichloro compound.

My invention is not restricted to the above-mentioned N-monochlorohydantoins, as my herein-described process may be carried out with any of the disubstituted hydantoins by halogenating and then reacting the resulting dihalo disubstituted hydantoin with an unhalogenated disubstituted hydantoin. The disubstituted hydantoins useful for this purpose may be derived from various ketones, for example, dialkyl ketones, alkyl alkylene ketones, dialkylene ketones, cyclo-aliphatic ketones (e. g., cyclohexanone and cyclohexenone, alkyl cyclohexyl ketones, and the like), alkyl aryl ketones, diaryl ketones, and various other ketonic compounds such as keto-esters, keto-acids, keto-alcohols, keto-ethers, and the like.

I claim:

1. The process for the production of an N-monochlorohydantoin, which comprises reacting an unchlorinated 5,5-dialkyl hydantoin containing two unsubstituted =NH groups with a substantially equimolar proportion of an N,N'-dichloro-5,5-dialkyl hydantoin, both of said hydantoins having the same alkyl groups.

2. The process for the production of an N-monochloro-5,5-dimethyl hydantoin which comprises reacting 5,5-dimethyl hydantoin with a substantially equimolar proportion of 1,3-dichloro-5,5-dimethyl hydantoin.

3. The process for the production of an N-monohalohydantoin which comprises reacting an unhalogenated 5,5-hydrocarbon radical disubstituted hydantoin having two unsubstituted =NH groups with an N,N'-dihalo-5,5-hydrocarbon radical disubstituted hydantoin.

4. The process for the production of an N-monochlorohydantoin which comprises reacting an unchlorinated 5,5-hydrocarbon radical disubstituted hydantoin having two unsubstituted =NH groups with a substantially equimolar proportion of an N,N'-dichloro-5,5-hydrocarbon radical disubstituted hydantoin, the 5,5-substituent groups being the same in both of said hydantoins.

5. The process according to claim 4 carried out in the presence of water.

6. The process according to claim 4 in which the reactants are mixed together with an amount of water less than that required to completely dissolve the product and the resulting N-monochlorohydantoin is separated from the mixture.

7. The process according to claim 4 which is carried out by heating the reactants to a temperature sufficiently high to form a molten mass and thereafter cooling said mass to solidify the reaction product.

8. The process according to claim 4 in which the reaction is carried out in the presence of a nonaqueous solvent which is substantially chemically inert towards said reactants and the reaction product.

9. A stable, active halogen-yielding nonaqueous mixture of hydantoins consisting essentially of an N,N'-dihalo-5,5-hydrocarbon radical disubstituted hydantoin and an unhalogenated 5,5-hydrocarbon radical disubstituted hydantoin containing two unsubstituted =NH groups, in the proportions of 0.25 to 3 moles of the unhalogenated hydantoin to one mole of the dihalohydantoin.

10. A stable, active chlorine-yielding nonaqueous mixture of hydantoins consisting essentially of an N,N'-dichloro-5,5-hydrocarbon radical disubstituted hydantoin and an unhalogenated 5,5-hydrocarbon radical disubstituted hydantoin containing two unsubstituted =NH groups, in the proportion of 0.25 to 3 moles of the unhalogenated hydantoin to one mole of the dichlorohydantoin.

11. A stable, active chlorine-yielding nonaqueous mixture of hydantoins consisting essentially of an N,N'-dichloro-5,5-dialkyl hydantoin and a substantially equimolar amount of an unhalogenated 5,5-dialkyl hydantoin, the 5,5-dialkyl groups being the same in both of said hydantoins.

12. A stable, active chlorine-yielding nonaqueous mixture of hydantoins consisting essentially of 0.25 to 3 moles of 1,3-dichloro-5,5-dimethyl hydantoin and 1 mole of 5,5-dimethyl hydantoin.

13. A stable, active chlorine-yielding nonaqueous mixture of hydantoins consisting essentially of 1,3-dichloro-5,5-dimethyl hydantoin and 5,5-dimethyl hydantoin, said 5,5-dimethyl hydantoin being present therein in amounts ranging from 0.5 to 3.0 moles, per mole of 1,3-dichloro-5,5-dimethyl hydantoin.

14. A stable, active chlorine-yielding nonaqueous mixture of hydantoins consisting essentially of substantially equimolar proportions of 1,3-dichloro-5,5-dimethyl hydantoin and 5,5-dimethyl hydantoin.

PAUL LA FRONE MAGILL.

REFERENCES CITED

The following references are of record in the file of this patent:

UNITED STATES PATENTS

| Number | Name | Date |
| --- | --- | --- |
| 2,130,805 | Levine | Sept. 20, 1938 |
| 2,311,507 | Arthur | Feb. 16, 1943 |
| 2,225,384 | Greenacher et al. | Dec. 17, 1940 |
| 2,155,863 | Jacobson | Apr. 25, 1939 |
| 2,354,210 | Jacobson | July 25, 1944 |

OTHER REFERENCES

Journal fur Praktische Chemie, N. F., vol. 113 (1926), pages 248–249.

Berichte, vol. 43, pages 1984–1992 (1910).

Henze et al., Journal of Org. Chem., Jan. 1943, page 24.

Analen der Chemie, vol. 327 (1902–1903), pages 380–381.